United States Patent
Kang et al.

(10) Patent No.: US 10,367,864 B2
(45) Date of Patent: Jul. 30, 2019

(54) ELECTRONIC DEVICE AND METHOD FOR CONTROLLING ELECTRONIC DEVICE

(71) Applicant: LG ELECTRONICS INC., Seoul (KR)

(72) Inventors: Donghyun Kang, Seoul (KR); Seungryul Yang, Seoul (KR); Kyoungsoo Moon, Seoul (KR); Jinpil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 15/026,552

(22) PCT Filed: Nov. 4, 2014

(86) PCT No.: PCT/KR2014/010491
§ 371 (c)(1),
(2) Date: Mar. 31, 2016

(87) PCT Pub. No.: WO2015/065149
PCT Pub. Date: May 7, 2015

(65) Prior Publication Data
US 2016/0241614 A1 Aug. 18, 2016

Related U.S. Application Data

(60) Provisional application No. 61/899,305, filed on Nov. 4, 2013, provisional application No. 61/911,983, filed on Dec. 4, 2013.

(51) Int. Cl.
*H04N 21/414* (2011.01)
*H04L 29/06* (2006.01)
(Continued)

(52) U.S. Cl.
CPC ...... *H04L 65/4069* (2013.01); *H04L 61/2007* (2013.01); *H04L 65/1069* (2013.01);
(Continued)

(58) Field of Classification Search
CPC .......... H04L 61/20; H04L 65/10; H04N 21/41
(Continued)

(56) References Cited

U.S. PATENT DOCUMENTS

2008/0046333 A1    2/2008  Kawakita
2013/0291015 A1*  10/2013  Pan .................... H04N 5/4403
                                                              725/37
2017/0308413 A1*  10/2017  Ryu .................... H04L 67/141

FOREIGN PATENT DOCUMENTS

CN    101019147 A    8/2007
CN    103348633 A    10/2013
(Continued)

OTHER PUBLICATIONS

Smart TV Alliance (Technical Specification) Version 3.0; Sep. 2013; pp. 1-49.*

(Continued)

*Primary Examiner* — Glenford J Madamba
(74) *Attorney, Agent, or Firm* — Birch, Stewart, Kolasch & Birch, LLP

(57) ABSTRACT

Disclosed are an electronic device and a method for controlling an electronic device. The electronic device comprises an application processor, a network processor, a control unit connected to a companion device, and a communication unit for transmitting/receiving data to/from the companion device, wherein the application processor makes a request for connection with the companion device to the network processor and the network processor connects the companion device to the application processor having made (Continued)

the request for the connection when receiving the request for the connection from the companion device.

6 Claims, 6 Drawing Sheets

(51) Int. Cl.
    *H04N 21/443*     (2011.01)
    *H04N 21/643*     (2011.01)
    *H04N 21/81*     (2011.01)
    *H04L 29/12*     (2006.01)
    *H04N 21/41*     (2011.01)

(52) U.S. Cl.
    CPC ... *H04N 21/4126* (2013.01); *H04N 21/41407* (2013.01); *H04N 21/4433* (2013.01); *H04N 21/64322* (2013.01); *H04N 21/8173* (2013.01); *H04N 21/4122* (2013.01)

(58) Field of Classification Search
    USPC .......................................................... 709/219
    See application file for complete search history.

(56) References Cited

FOREIGN PATENT DOCUMENTS

| | | |
|---|---|---|
| EP | 2750309 A1 | 7/2014 |
| KR | 10-2007-0073749 A | 7/2007 |
| KR | 10-2012-0000142 A | 1/2012 |
| KR | 10-2012-0114877 A | 10/2012 |
| KR | 10-2013-0058215 A | 6/2013 |
| KR | 10-2013-0097831 A | 9/2013 |
| WO | 2006/018877 A1 | 2/2006 |
| WO | WO 2013/126507 A1 | 8/2013 |
| WO | WO 2013126507 A1 * | 8/2013 ......... G06F 17/3089 |

OTHER PUBLICATIONS

Fette et al., "The WebSocket Protocol," Internet Engineering Task Force (IETF), Dec. 1, 2011, retrieved from https://tools.ietf.org/html/rfc6455, XP055358745, pp. 1-72.

Fukai et al., "Web Browser based GUI for TV", The 1st IEEE Global Conference on Consumer Electronics, 2012, pp. 579-580, XP055337255.

* cited by examiner

ELECTRONIC DEVICE AND METHOD FOR CONTROLLING ELECTRONIC DEVICE

CROSS REFERENCE TO RELATED APPLICATIONS

This application is the National Phase of PCT International Application No. PCT/KR2014/010491, filed on Nov. 4, 2014, which claims priority under 35 U.S.C. 119(e) to U.S. Provisional Application Nos. 61/899,305, filed on Nov. 4, 2013 and 61/911,983, filed on Dec. 4, 2013, all of which are hereby expressly incorporated by reference into the present application.

TECHNICAL FIELD

The present invention relates to an electronic device and a method of controlling the electronic device.

BACKGROUND ART

With development in broadcast and communication technologies, a technology for various broadcast devices and broadcast services has been developed. Recently, a smartphone and a smart television (TV) have been popularized, and various applications can be executed in the smartphone and the smart TV. When one application is being executed in the smartphone, a user may desire to execute the application, which is being executed in the smartphone, in the smart TV. In this case, in general, the user may operate the smart TV along a predetermined path to execute the application which is being executed in the smartphone. In a recent communication environment, there is increasing user demand for an application which is being used by the user to communicate with an application which is being executed in another device. However, as described in the foregoing, it is inconvenient to separately operate the smart TV to execute an application.

To resolve such inconvenience, there is a need for a technology for allowing communication between an application of one device and an application of another device.

DISCLOSURE

Technical Problem

An object of the present invention devised to solve the problem lies in an electronic device that allows communication between an application of one device and an application of another device, and a method of controlling the electronic device.

Technical Solution

The object of the present invention can be achieved by providing an electronic device including a controller including an application processor and a network processor and connecting the electronic device to a companion device, and a communication unit for exchanging data with the companion device, wherein the application processor requests that the network processor establish a connection to the companion device, and the network processor connects the application processor requesting the connection and the companion device to each other in response to a connection request from the companion device.

The network processor may be a WebSocket server.

In addition, the application processor may transmit, to the network processor, host request header information indicating information about at least one of an electronic device or a companion device operating in the network processor.

In addition, the network processor may generate a stream head of the application processor and include the stream head in a stream head group in response to the connection request from the application processor, and generate a stream head of the companion device and connect the stream head of the companion device to a matching stream head of the application processor included in the stream head group in response to the connection request from the companion device.

In addition, the network processor may remove at least one of the matching stream head of the application processor or the stream head of the companion device from the stream head group.

In addition, the application processor may transmit an Internet protocol (IP) address of the companion device to be connected to the network processor.

In addition, the network processor may connect the application process and the companion device to each other using the same port.

In another aspect of the present invention, provided herein is a method of controlling an electronic device, including connecting the electronic device to a companion device, and exchanging data with the companion device, wherein the connecting includes, in response to an application processor requesting that a network processor establish a connection to the companion device and the network processor receiving a connection request from the companion device, connecting the application processor requesting the connection and the companion device to each other.

In addition, the network processor may be a WebSocket server.

In addition, the method may further include transmitting, by the application processor, host request header information indicating information about at least one of an electronic device or a companion device operating in the network processor to the network processor.

In addition, the method may further include generating, by the network processor, a stream head of the application processor and including the stream head in a stream head group in response to the connection request from the application processor, and generating, by the network processor, a stream head of the companion device and connecting the stream head of the companion device to a matching stream head of the application processor included in the stream head group in response to the connection request received from the companion device.

In addition, the method may further include removing, by the network processor, at least one of the matching stream head of the application processor or the stream head of the companion device from the stream head group.

In addition, the method may further include transmitting, by the application processor, an IP address of the companion device to be connected to the network processor.

In addition, the connecting may include connecting the application process and the companion device to each other using the same port.

Advantageous Effects

According to various embodiments of the present specification, an electronic device and a method of controlling the electronic device may perform communication between an application which is being executed in one electronic device and an application which is being executed in another electronic device.

In addition, the electronic device and the method of controlling the electronic device may interface one electronic device and another electronic device using a WebSocket server for communication between the electronic devices.

Further, the electronic device and the method of controlling the electronic device may connect one electronic device with another electronic device on a one-to-one basis.

BEST MODE

Hereinafter, preferred embodiments of the present specification that can specifically implement the above-described object will be described with reference to the accompanying drawings. In this instance, a configuration and effect of the present specification illustrated in a figure and described with reference to the figure are described as at least one embodiment, and a spirit, a core configuration, and effect of the present specification are not restricted by the configuration and effect.

Although the terms used in the following description are selected, as much as possible, from general terms that are widely used at present while taking into consideration the functions obtained in accordance with the present invention, these terms may be replaced by other terms based on intentions of those skilled in the art, customs, emergence of new technologies, or the like. In addition, in a particular case, terms that are arbitrarily selected by the applicant of the present invention may be used. In this case, the meanings of these terms will be described in corresponding description parts of the invention. Accordingly, it should be noted that the terms used herein should be construed based on practical meanings thereof and the whole content of this specification, rather than being simply construed based on names of the terms.

Figure 1:
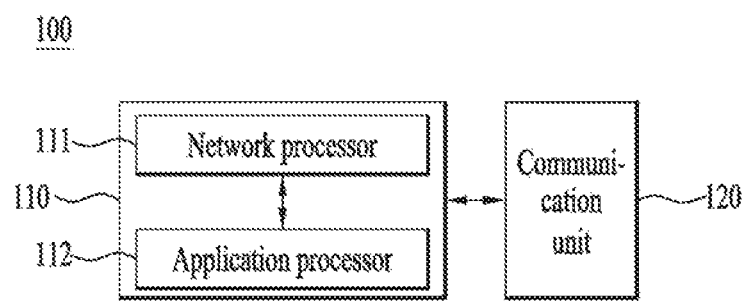
FIG. 1 is a block diagram of an electronic device according to an embodiment of the present invention.

FIG. 1 is a block diagram of an electronic device according to an embodiment of the present invention.

Referring to FIG. 1, the electronic device 100 includes a controller 110 and a communication unit 120. The controller 110 may establish a communication linkage with a companion device. In addition, when the communication linkage with the companion device is established, the communication unit 120 may exchange data with the companion device.

In addition, the controller 110 may include a network processor 111 and an application processor 112. The application processor 112 may request connection with the companion device from the network processor 111.

The network processor 111 may place the connection request received from the application processor 112 in a standby state since the network processor 111 has not been connected with the companion device. Thereafter, the network processor 111 may receive a connection request from the companion device. The network processor 111 may search for a matching connection request from the application processor 112 based on information received from the companion device. Upon finding the matching connection request, the network processor 111 may connect the companion device to the application processor 112.

As an example, the application processor 112 may correspond to an application module or an application browser. Alternatively, the application processor 112 may correspond to an HbbTV application. As an example, the network processor 111 may be implemented as a network module. Alternatively, the network processor 111 may correspond to a WebSocket server. The network processor 111 may interconnect the application processor 112 and the companion device. As an example, when the network processor 111 is implemented as the WebSocket server, each of the application processor 112 and the companion device may be regarded as one client. In other words, the WebSocket server may connect a first client and a second client. Alternatively, each of the first client and the second client may be referred to as a peer. Depending on cases, the WebSocket server may be implemented as a separate device outside the electronic device.

Meanwhile, the application processor 112 may operate one application. In addition, the companion device may operate one application. The application processor 112 may be connected to the companion device through the network processor 111. The companion device may receive data from the application processor 112 and receive and drive an application which is being driven by the application processor 112. Alternatively, each of the application processor 112 and the companion device may drive an application. The application processor 112 may be connected to the companion device to exchange data with the companion device. In this case, the electronic device 100 and the companion device may be considered to perform inter-application communication.

The WebSocket server may be used as a repeater and may generate a communication channel between applications. The generated communication channel may enable the electronic device 100 and the companion device to communicate with each other. The WebSocket server may connect a channel between applications requesting the same information using a name ID and an origin ID of an application desiring to perform communication to generate a communication channel. For example, the above-described method may connect an application (client) and an application (client) without correcting a WebSocket API in HbbTV 2.0.

In this specification, respective terms are interchangeable.

Figure 2:
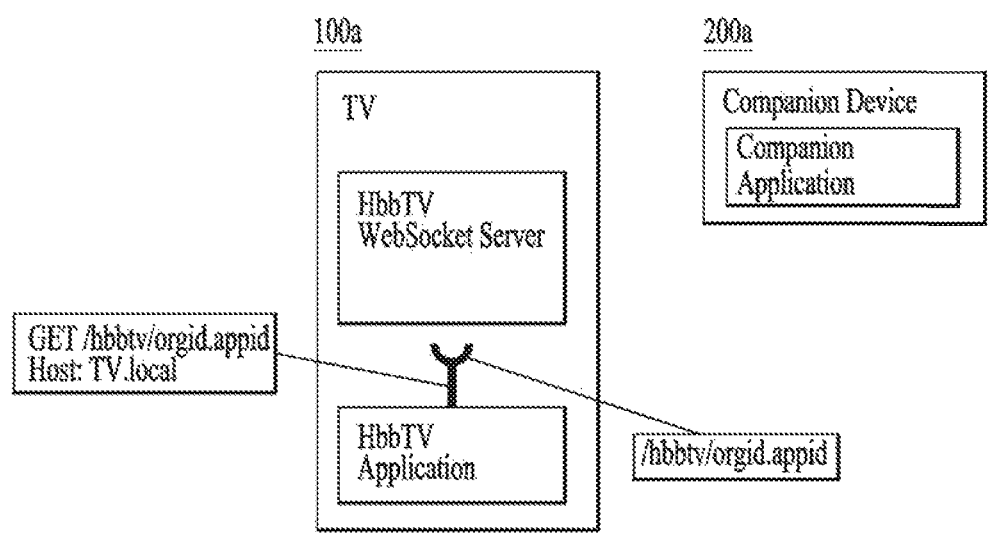
FIG. 2 is a diagram for description of connection of a first client according to an embodiment of the present invention.

FIG. 2 is a diagram for description of connection of a first client according to an embodiment of the present invention.

FIG. 2 illustrates an electronic device 100a and a companion device 200a. The electronic device 100a may include an application processor and a network processor. As an example, the application processor may correspond to an HbbTV application or a first application, and the network processor may correspond to an HbbTV WebSocket server. The companion device 200a may include a companion device processor. As an example, the companion device processor may correspond to a companion application or a second client. The WebSocket server may need to be changed to connect the clients. Hereinafter, an operation related to change of the WebSocket server will be described. The changed WebSocket server may be driven in HbbTV 2.0 TV.

In general, a WebSocket client may designate a remote host to which the WebSocket client desires to be connected, and a relative URI for a desired service in the host in an initial GET request along with a WebSocket connection upgrade header. However, in HbbTV, a peer (for example, a companion device) for communication connection may not be in contact with the WebSocket server. Therefore, a connection request from the first client for client-to-client connection needs to be kept active until a target peer requests connection.

In this regard, an upgraded WebSocket protocol GET request may include two fields that define particular uses. A Request-URI may have a predefined format with a common prefix string. This field may be used to match corresponding communication peers. A Host request-header field may either refer to a TV set that operates in the WebSocket server (when communication with an arbitrary peer having a matching Request-URI is established), or refer to a specific companion device (when communication with a designated device and a matching Request-URI is established). In other words, the application processor may transmit, to the network processor, host request header information that indicates information about an electronic device or a companion device operating in the network processor.

The format for the Request-URI field may be according to the following ABNF grammar:
HbbTV-Request-URI="/hbbtv/" org-id "." app-id
org-id=8HEX
app-id=4HEX In response to the Request-URI, the WebSocket server needs to generate a stream head, which may mean a half open connection associated with a URI request supported in an upgraded GET request by a client. The WebSocket server may maintain the first client in a standby state while waiting for another peer to appear rather than immediately responding to a WebSocket Protocol Handshake response. When the WebSocket server desires to implement a timeout, the server may respond with a 504 Gateway Timeout response.

A client may not use a Sec-WebSocket Protocol header when requesting client-to-client connection. The server may ignore the Sec-WebSocket Protocol header in the request for client-to-client connection. The server may respond with a 403 Forbidden response if a Host header field in the client-to-client connection request does not specify any device on a local sub-network that the server is attached to. All HbbTV 2.0 WebSocket clients may use a method to request client-to-client connection from HbbTV 2.0 WebSocket servers.

In other words, usually, a WebSocket client would specify the remote host to which it wishes a connection to be established, and the relative URI for the desired service on that host in the initial GET request along with the WebSocket connection upgrade header. In the HbbTV case however, it can not be assumed that the peer to which communications are to be established, has contacted the WebSocket server yet. A connection request from a client in the special client-to-client mode, hence needs to be kept active until another, suitable peer arrives.

To achieve this, we define special uses for two fields of the WebSocket protocol upgrade GET request.

The Request-URI—which is part of the Request-Line—takes a predefined format with a common prefix string. This field is used to match corresponding communication peers.

The Host request-header field shall either refer to the TV set running the WebSocket server (in which case communications with any peer with a matching Request-URI will be established), or to a specific companion device (in which case communications only with the designated device, and with a matching Request-URI will be established).

The format for the Request-URI field shall be according to the following ABNF grammar:
HbbTV-Request-URI="/hbbtv/" org-id "." app-id
org-id=8HEX
app-id=4HEX These rules are illustrated in FIG. 2. In response to such a request, an HbbTV WebSocket server shall create a stream head, that is a half open connection, which is associated with the Request-URI supplied in the upgrade GET request by the client. The server shall not respond immediately with a WebSocket Protocol Handshake response, but instead wait for other peers to appear, and thereby keep the first client waiting. In case the server wishes to implement a time-out, it shall respond with a 504 Gateway Timeout response.

Clients shall not use the Sec-WebSocket-Protocol header when requesting client-to-client connections. Servers may ignore the Sec-WebSocket-Protocol header in requests for client-to-client connections. Servers shall respond with a 403 Forbidden response if the Host header field in a client-to-client connection request does not specify a device on any of the local sub-networks that the server is attached to. All HbbTV 2.0 WebSocket clients shall use the method described in this section to request client-to-client connections from HbbTV 2.0 WebSocket servers.

Figure 3:
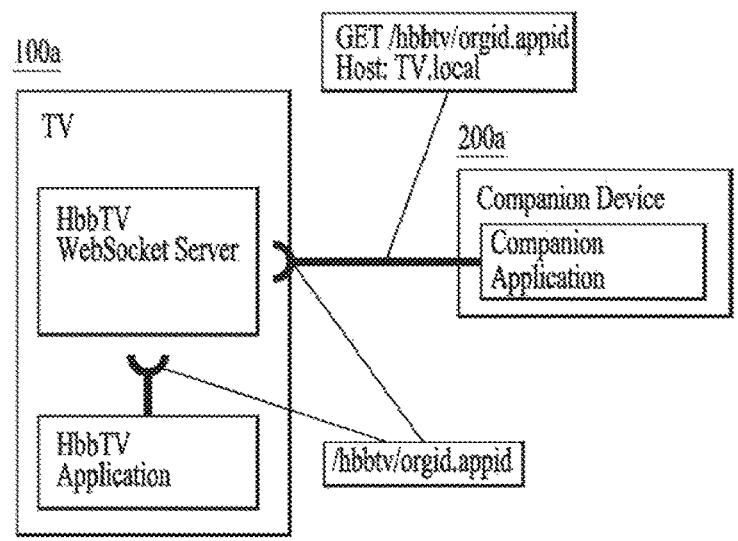
FIG. 3 is a diagram for description of connection of a second client according to an embodiment of the present invention.

FIG. 3 is a diagram for description of connection of a second client according to an embodiment of the present invention.

FIG. 3 illustrates an electronic device 100a and a companion device 200a. The electronic device 100a may include an application processor and a network processor. The network processor (for example, a WebSocket server) may receive a connection request from an HbbTV application and a companion application.

When another client requests a client-to-client connection using the above-described method, the server may create a stream head for the new request as shown in FIG. 3. After the new stream head is created, the server may search the collection of stream heads currently waiting to be connected, for Request-URI and Host header field values matching a newly created stream head. If no match is found, the server may add the newly created stream head to the collection of stream heads currently waiting to be connected, and may keep waiting for a further client-to-client connection request.

In other words, when another client requests a client-to-client connection using the method as above, the server shall also create a stream head for that new request as shown in FIG. 3. After a new stream head is created, the server shall search the collection of stream heads currently waiting to be connected, for Request-URI and Host header field values matching those of the newly created stream head. If no match is found, the server shall add the newly created stream head to the collection of stream heads currently waiting to be connected, and shall keep waiting for further client-to-client connection requests.

Figure 4:
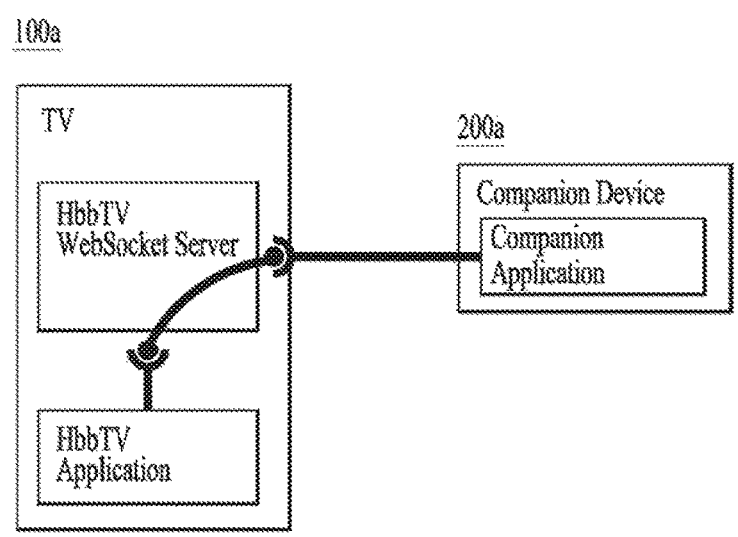
FIG. 4 is a diagram for description of connection between the first and second clients according to an embodiment of the present invention.

FIG. 4 is a diagram for description of connection between the first and second clients according to an embodiment of the present invention.

FIG. 4 illustrates an electronic device 100a and a companion device 200a. The electronic device 100a may include an application processor and a network processor. The network processor (for example, a WebSocket server) may connect an HbbTV application and a companion application.

If a newly created stream head is associated with the same Request-URI and Host header field values as a stream head in the collection of stream heads currently waiting to be connected, the WebSocket server may remove the matching stream head from the collection, and may establish a full-duplex communications channel between the two stream heads.

When the two stream heads are connected, the server immediately outputs all data received from one stream head without alteration to the respective other stream heads. In this way, a transparent communications channel may be established between the two clients.

When one of the two clients transmits a Close frame, the server may transmit a corresponding Close frame to another client. When one of the two clients cancels connection without transmitting a Close frame, the server may generate a Close frame, and transmit the same to the other client.

In other words, the network processor may generate a stream head of the application processor and include the stream head in a stream head group in response to a connection request from the application processor. In addition, in response to a connection request from the companion device, the network processor may generate a stream head of the companion device and verify whether a matching stream head is present. When the matching stream head is present, the network processor may connect the stream head of the application processor and the matching stream head of the companion device included in the stream head group. In this instance, the network processor may remove the matching stream head of the application processor or the matching stream head of the companion device from the stream head group.

In other words, if a newly created stream head is associated with the same Request-URI and Host header field values as a stream head in the collection of stream heads currently waiting to be connected, the server shall remove the matching stream head from the collection, and shall establish a full-duplex communications channel between the two stream heads as shown in FIG. 4. Once the two stream heads are connected, the server output all data received from one stream head immediately and unaltered to the respective other stream head. Thereby, a transparent communications channel is established between the two clients. If one of the two clients sends a Close frame, the server shall send a corresponding Close frame to the other client. If one of the two clients disconnects without sending a Close frame, the server shall generate a Close frame, and shall send it to the other client.

Figure 5:
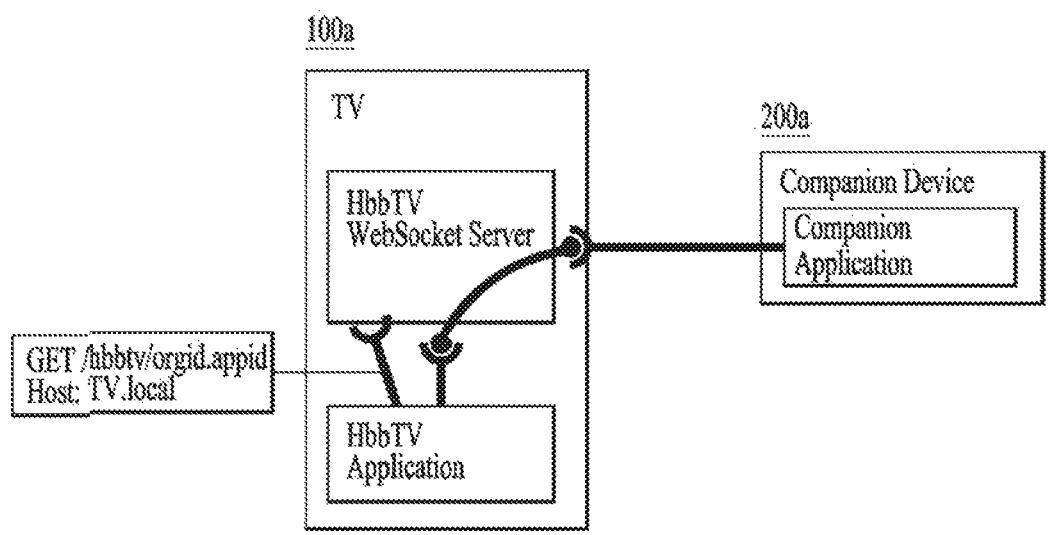
FIG. 5 is a diagram for description of an additional connection request according to an embodiment of the present invention.

FIG. 5 is a diagram for description of an additional connection request according to an embodiment of the present invention.

Referring to FIG. 5, an HbbTV application (client) is connected to a companion application (client) of a companion device 200a. In addition, the HbbTV application may generate another stream head for another client. The HbbTV application may be additionally connected to another application. A stream head can be removed from the collection of stream heads available for connection, prior to establishing a client-to-client connection, and thus the client-to-client connection may be established on a one-to-one basis. When a client desires to communicate with one or more other clients, the client may issue further connection requests to the server until the maximum number of processable client-to-client connections is reached.

The WebSocket server does not allow one or more stream heads for the same client with the same Request-URI and Host to be on the collection of stream heads currently waiting to be connected. If a client issues another client-to-client connection request with the same Request-URI and Host before the previous one has been successfully connected or has timed-out, the server may respond with a 403 Forbidden response.

A Client may have several client-to-client connection requests with different Request-URI/Host combinations in the waiting to be connected state. The client may not attempt to request a connection to another client with the same Request-URI/Host combination before the previous one has been successfully connected or has timed-out.

In other words, any stream head be removed from the collection of stream heads available for connecting, prior to establishing a client-to-client connection, such client-to-client connections are one-to-one only. If a client wishes to communicate to more than one other client, it shall issue further connection requests to the server until the maximum number of client-to-client connections it is able to process, has been reached. Servers shall not allow more than one stream heads for the same client with the same Request-URI and Host to be on the collection of stream heads currently waiting to be connected. If a client issues another client-to-client connection request with the same Request-URI and Host, before the previous one has been successfully connected or has timed-out, the server shall respond with a 403 Forbidden response. Clients may have several client-to-client connection requests with different Request-URI/Host combinations in the waiting to be connected state. Clients shall not attempt to request another client-to-client connection with the same Request-URI/Host combination, before the previous one was either successfully connected or has timed-out.

An "/hbbtv/orgid.appid scheme" for the Request-URI may be used as an escape into the special server client-to-client behavior in order to allow it to be implemented along with other, standard WebSocket server functionalities, and without interfering with the same. Two methods may be used for matching the Request-URI and Host header field. First, when a specific device (client) is targeted by the Host header, the client may desire to communicate with the targeted specific client. The presence thereof may be recognized through other means (for example, SSDP as part of UPnP). Second, when the Host header field targets the server, it may be the same for all clients targeting the same server, which indicates that only the Request-URI is a discriminating factor for selecting suitable communication peers. In this way, effectively targeting the server in the Host header field provides a wildcard match with any other client using the same Request-URI and targeting the server. As such, both dedicated and opportunistic connection establishment strategies are possible.

In other words, we chose the special "/hbbtv/orgid.appid" scheme for the Request-URI as an escape into the special server client-to-client behavior in order to allow it to be implemented along with other, standard WebSocket server functionalities, and without interfering with them. The choice of matching the Request-URI and Host header field allows for two approaches: if a specific device is targeted by the Host header, the client only wishes to talk to that specific other client. It may have learnt about its existence through other means (e.g. SSDP as part of UPnP). Secondly, if the Host header field targets the server, it will be the same for all clients targeting the same server. This will result in only the Request-URI being the discriminating factor for choosing suitable communication peers. Hence, targeting the server in the Host header field effectively provides a wildcard match with any other client using the same Request-URI and also targeting the server. So both, dedicated and opportunistic connection establishment strategies are possible.

Since the HbbTV 2.0 WebSocket server does not perform any authentication, authorization, or other verification, no trust can be associated with client-to-client connections, or between clients and WebSocket servers. Clients that desire to exchange private information or sensitive information through a WebSocket server may employ end-to-end encryption to ensure communication privacy. Such clients may employ cryptographic methods to establish the identity and authenticity of any communication peers with which the clients desire to communicate through a WebSocket server. Since an HbbTV 2.0 WebSocket server establishes connections to clients indicated through the Internet, it is very unlikely that a successful denial-of-service attack could be staged against another client through an HbbTV WebSocket server. The client under attack can simply stop asking the server to be connected to other clients.

Since it is defined that a server may reject simultaneous connection attempts to a not yet connected Request-URI/Host combination, a denial-of-service attack may be attempted against the server. This could be done by repeatedly sending the same connection request to provoke error responses, or by sending random connection requests in an attempt to exhaust the server's resources by creating many open stream heads. Both techniques are general strategies for HTTP servers, and are not specific to WebSocket or HbbTV. It is hence expected that any WebSocket server implementation may have suitable mitigation mechanisms (e.g. by stopping sending responses or creating stream heads).

In other words, since the HbbTV 2.0 WebSocket server does not perform any authentication, authorisation, or other verification, no trust can be associated with client-to-client connections, or between clients and WebSocket servers. Clients that wish to exchange private, or otherwise sensitive information through a WebSocket server should therefore employ end-to-end encryption to ensure the privacy of the communication. Likewise, such clients should employ cryptographic methods to establish the identity and authenticity of any communication peers to which they wish to communicate through a WebSocket server. Since an HbbTV 2.0 WebSocket server will establish connections only to clients who have indicated the intent of being connected, it is very unlikely that a successful denial-of-service attack could be staged against another client through an HbbTV WebSocket server. The client under attack can simply stop asking the server to be connected to other clients.

Since we defined that a server shall reject simultaneous connection attempts to a not yet connected Request-URI/Host combination, a denial-of-service attack might be attempted against the server itself. This could be done by repeatedly sending the same connection request to provoke error responses being generated, or by sending random connection requests in an attempt to exhaust the server's resources by creating many open stream heads. Both techniques are general strategies against HTTP servers, and are not specific to WebSocket or HbbTV use of it. We hence expect that any WebSocket server implementation (be it of the HbbTV flavour or not) will have suitable mitigation mechanisms (e.g. by stopping sending responses or creating stream heads).

Figure 6:
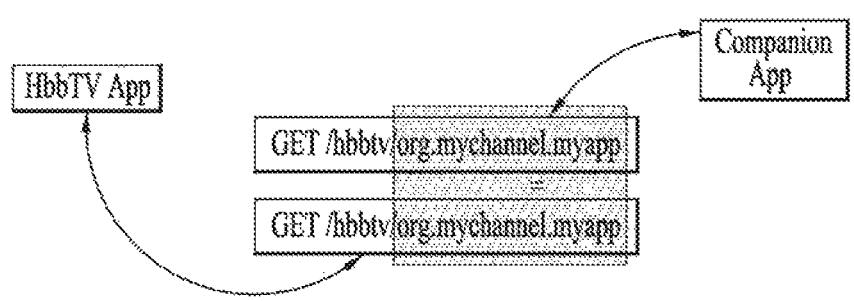
FIG. 6 is a diagram for description of connection between clients when an IP address is not present according to an embodiment of the present invention.

FIG. 6 is a diagram for description of connection between clients when an IP address is not present according to an embodiment of the present invention.

FIG. 6 illustrates a method of establishing a communication linkage between clients. The above-described inter-application communication method based on WebSocket may enable a WebSocket server to connect applications, URI paths (paths excluding a host name) of which are the same, to perform inter-application communication. Inter-client communication may divide an application driven in an electronic device (for example, a TV application) and an application driven in a companion device (for example, a CS application), thereby selectively performing inter-application communication.

As an example, in HbbTV, a Request-URI may be configured without including an IP address. A URI path may start with a reserved word ("hbbtv") indicating HbbTV after a root ("/"), and may include an organization or company ID (org-id) and an application ID (app-id) thereafter. The WebSocket server (network processor) may connect applications, WebSocket API call URI paths of which are the same.

Syntax) GET "/hbbtv/"org-id"."app-id

Example) GET/hbbtv/org.mychannel.myapp

Meanwhile, respective clients requesting connection may use the same port or different ports. When the clients use the same port, the WebSocket server may recognize that a called application is an HbbTV application if IPs of applications calling a WebSocket API are the same, and may recognize that a called application is a companion device application if the IPs are different from each other. When the same port is used, the WebSocket server may simplify server implementation and test, and discovery is unnecessary. (With most WebSocket libraries, need to start a different instance per port. Single port drastically simplifies server implementation and test. No discovery needed if app-2-app server listens on well-defined port on the TV.)

Next, a description will be given of a case in which the clients use different ports. This case refers to a case in which an application driven by a TV and an application driven by a companion device use the same URI path and use different ports. As an embodiment, an HbbTV application driven by the TV may use port 8900, and an application driven by the companion device may use port 8901. When the WebSocket server knows ports used by a TV application and a companion application, it is possible to distinguish between communication between the TV application and the companion application and inter-companion application communication. When different ports are used, if several companion devices are connected to a TV using the same host request-header, clients may be easily connected by distinguishing the companion devices and the TV. Since the TV and the companion devices communicate with each other by being connected to the WebSocket server through different ports while host request-headers are the same, it is possible to distinguish between the companion device and the TV. Therefore, it is possible to take complementary measures in terms of security.

Figure 7:
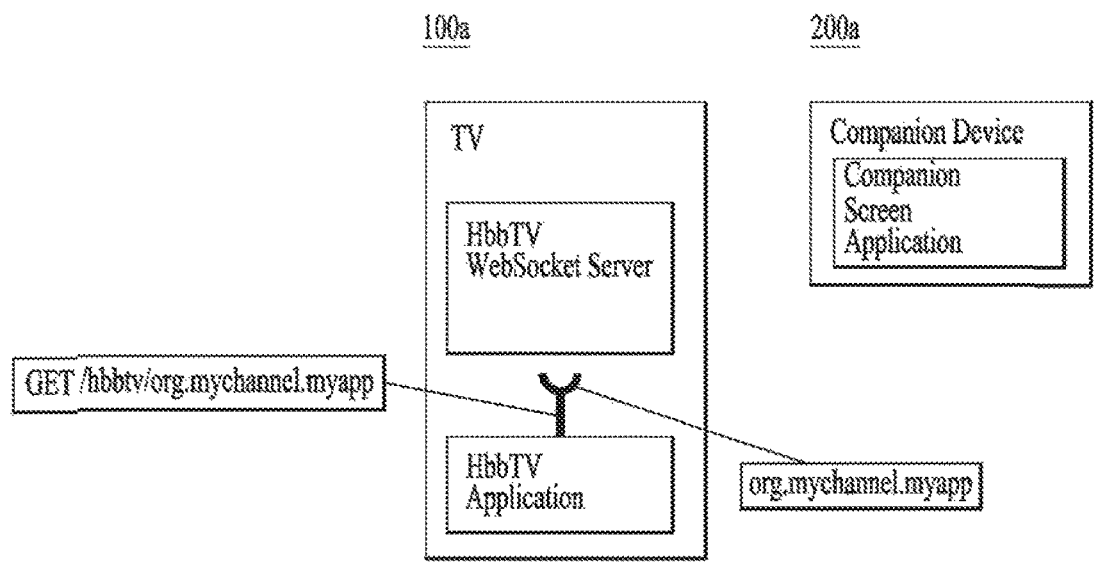
FIG. 7 is a diagram for description of standby connection for connection between applications according to an embodiment of the present invention.

FIG. 7 is a diagram for description of standby connection for connection between applications according to an embodiment of the present invention.

FIG. 7 illustrates an electronic device 100a and a companion device 200a. A TV application of the electronic device 100a may transmit a connection request to a WebSocket server. The TV application is included in the electronic device, and thus the WebSocket server may recognize the TV application as a local application. In addition, a companion application is present outside the electronic device, and thus the WebSocket server may recognize the companion application as a remote application. As an embodiment, an application may use methods below when requesting connection.

TABLE 1

| String getApp2AppLocalBaseURL( ) | |
|---|---|
| Description | Returns the base URL of the application to application communication service local end-point. |
| Arguments | No arguments |

TABLE 2

| String getApp2AppRemoteBaseURL( ) | |
|---|---|
| Description | Returns the base URL of the application to application communication service remote end-point. |
| Arguments | No arguments |

As an embodiment, a network processor may execute W3C WebSocket API, and may support a minimum of 200 simultaneous WebSocket connections.

The network processor may provide two service end points executed by a server side of a WebSocket protocol specification. A local end point is used for connection to the network processor by an HbbTV application. A remote end point may be connected to a home network by an application of another device, and is used to include a remote companion application or an HbbTV application driven by another HbbTV device. The HbbTV application may be connected to a local service end point of a network processor in which the application operates or a remote service end point of another hybrid terminal in the same home network. It is preferable that the network processor not be connected to a local service end point of another device in the home network. For example, this can be achieved by placing a local service end point of a local loopback interface of the network processor. When another service end point executes the service side of the WebSocket protocol specification, and the HbbTV application or the companion application uses the service end point, the hybrid terminal should not place the service end point on the same host and port combination as another service end point.

A basic URL for a service end point between applications may be a WebSocket URL. The WebSocket URL may define a host, a port, security, and a resource name of a service end point. A client needs to be connected to a host and a port specified by the WebSocket URL of the service end point. A resource name used in an initial protocol request by the client conforms to ABNF grammar.

resource-name=base-url-resource-name app-endpoint

Base-url-resource-name is a resource name derived from a WebSocket URL of a service end point. App-endpoint is an application specification and may be used for a client connection matching process corresponding to the client. A message of the corresponding client may be delivered through a WebSocket protocol. App-endpoint may be selected by an application developer to avoid collision. Therefore, app-endpoint may start with an ID formatted in reverse DNS notation uniquely related to the HbbTV application, the companion application, or a developer thereof. The hybrid terminal may support app-endpoint including a certain character permitted in a resource name by a minimum length of 1000 characters and the WebSocket protocol specification.

A service end point may support a minimum of ten simultaneous TCP socket connections from a client. When the client attempts to open connection between a server and a TCP socket, the server may reject a request if the server cannot manage simultaneous connection. Otherwise, the server may approve TCP socket connection, and start WebSocket protocol handshake. When the server receives a request handshake from the client, the server may not immediately respond with a handshake response. Instead, the server may wait until connection is paired or connection of the client is canceled. In this state, standby connection may be configured as connection. When the server attempts to execute time-out, the server may respond with a 504 gateway time-out response.

The server may ignore a certain origin header of a request handshake transmitted by the client. The client may not use a Sec-WebSocket-protocol header when requesting connection between clients. The server may ignore the Sec-WebSocket-protocol header in a request for connection between clients. The server may not approve a request from the client for protocol extension using the Sec-WebSocket-protocol header. When the client uses a Sec-WebSocket extension header, the server may not establish a connection using a scheme defined in the WebSocket protocol specification.

As illustrated in FIG. 7, an HbbTV application operating as a client may attempt connection with a local service end point which has app-endpoint of "org.mychannel.myapp" and base-url-resource-name of /hbbtv/. Connection with the companion device may be maintained in a standby state since the companion application has not been linked to communication between applications using the same app-endpoint.

Figure 8:
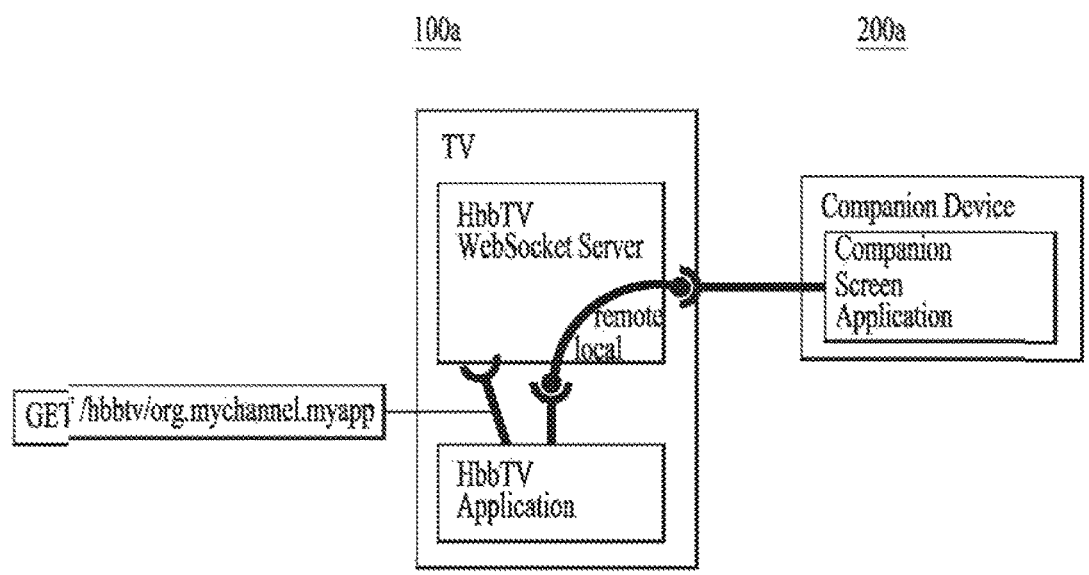
FIG. 8 is a diagram for description of a new connection request for connection with the second client according to an embodiment of the present invention.

FIG. 8 is a diagram for description of a new connection request for connection with a second client according to an embodiment of the present invention.

Referring to FIG. 8, an HbbTV application (client) is connected to a companion application (client) of a companion device 200a. In addition, the HbbTV application may generate another stream head for another client.

A server cannot permit one or more simultaneous standby connections from the same original IP address having the same app-endpoint. When successfully connected or when a client of an IP address prior to termination issues another connection request using the same app-endpoint, the server may respond with a 403 Forbidden response.

A client may desire establishment of connection between multiple simultaneous clients through the same service end points using different resource-name combinations. The client cannot attempt to request another connection from an existing service end point before standby to connect the service end point is successful or time-out or connection is canceled. This operation of the client may be defined by a WebSocket protocol specification.

According to FIG. 8, when a client desires to communicate with one or more clients, the client may wait until existing standby connection is paired. In this instance, an additional connection request may be issued to the server until a maximum number of processable inter-client connections is reached. In other words, the HbbTV application may generate a new standby connection request to permit establishment of inter-application communication.

Meanwhile, the client may include an IP address in a URI path.

Figure 9:
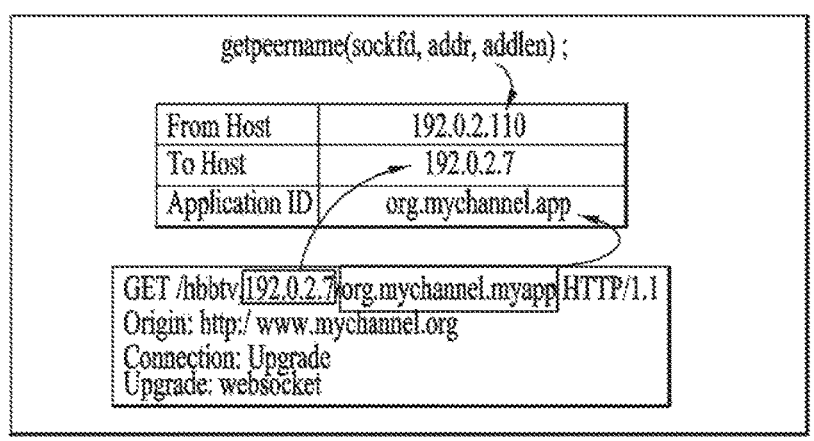
FIG. 9 is a diagram for description of setting of the first client when an IP address is included according to an embodiment of the present invention.

FIG. 9 is a diagram for description of setting of a first client when an IP address is included according to an embodiment of the present invention.

As an embodiment, the above-described URI path starts with a reserved word ("hbbtb") indicating HbbTV after a root ("/"), and may include an organization/company ID (org-id) and an application ID (app-id) thereafter. An application desiring to perform inter-application communication may add an IP address of a driven device to a URI path to designate a target application. A WebSocket server may connect applications, WebSocket API call URI paths of which are the same, according to IP to be used for communication.

Syntax) GET "/hbbtv/" target IP "/" org-id "." app-id
Example) GET /hbbtv/1.1.1.1/org.mychannel.myapp As an embodiment, a TV application A may be driven in IP 1.1.1.1, a companion application B may be driven in IP 1.1.1.2 (a first user terminal), and a companion application C may be driven in IP 1.1.1.3 (a second user terminal). In this instance, the TV application A may attempt to communicate with the companion application C. The TV application A may include IP (1.1.1.3) in which the companion application C is driven in a URI path which is included in a WebSocket request. In addition, the companion application C may include IP (1.1.1.1) of the TV application A in a URI path which is included in a WebSocket request.

According to FIG. 9, a URI path may correspond to hbbtv/192.0.2.7/org.mychannel.myapp HTTP/1/1. Here, 192.0.2.7 may correspond to an IP address of a target application. 192.0.2.110 may correspond to an IP address thereof. In addition, org.mychannel.myapp may correspond to an application ID.

Figure 10:
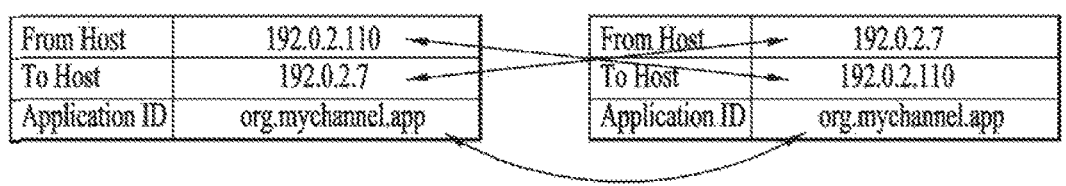
FIG. 10 is a diagram for description of setting of the first client and the second client when IP addresses are included according to an embodiment of the present invention.

FIG. 10 is a diagram for description of setting of a first client and a second client when IP addresses are included according to an embodiment of the present invention.

A WebSocket server may receive the URI request described with reference to FIG. 9 from each of the clients. Referring to FIG. 10, the first client has an IP address of 192.0.2.110, and the second client has an IP address of 192.0.2.7. When the first client requests connection from the second client, a start point (From Host) is 192.0.2.110, and a destination (To Host) is 192.0.2.7. In addition, an application ID may be org.mychannel.myapp. When the second client requests connection from the first client, a start point (From Host) is 192.0.2.7, and a destination (To Host) is 192.0.2.110. In addition, an application ID may be org.mychannel.myapp. That is, start points and destinations of the first client and the second client may be opposite to each other. However, application IDs may be the same. The WebSocket server may connect matching clients to each other.

In addition, a URI path including a host IP address may be used.

For example, the URI path may be used as below. Syntax) GET "/"hbbtv"/" host address"/"org-id "." app-id,
Example) GET /hbbtv/192.0.2.7/org.mychannel.myapp.

Figure 11:
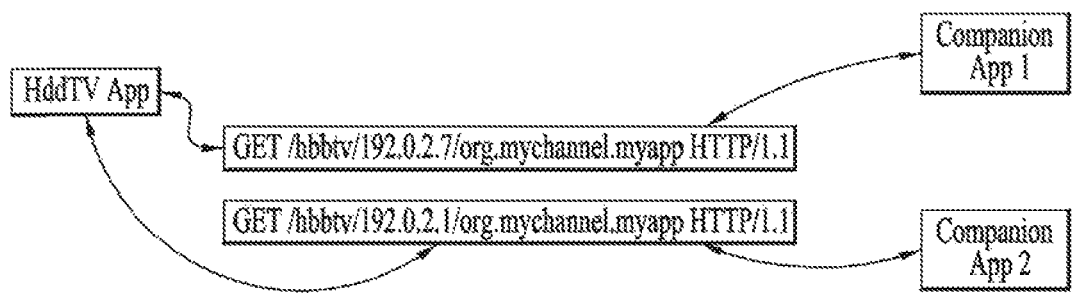
FIG. 11 is a diagram for description of an embodiment of connection to a plurality of second clients when IP addresses are included.

FIG. 11 is a diagram for description of an embodiment of connection to a plurality of second clients when IP addresses are included.

Referring to FIG. 11, an HbbTV has a certain IP address and includes an application ID of org.mychannel.myapp. A first companion application IP address is 192.0.2.7, and a second companion application IP address is 192.0.2.1. Application IDs of first and second companion applications correspond to org.mychannel.myapp. As described above with reference to FIG. 10, the WebSocket server may connect matching clients to each other. Therefore, the WebSocket server may connect matching clients to each other in response to requests from respective clients.

In this way, when an IP address is used in a URI path, both clients designate an object to be connected. Thus, security is improved, clients may be connected to each other, and all information may be matched without extra effort. Meanwhile, even when an IP address is used in a URI path, respective clients may use the same port or may use different ports.

Figure 12:
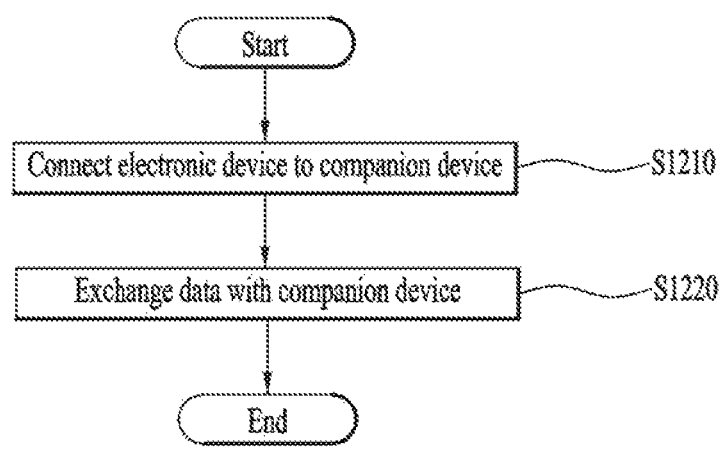
FIG. 12 is a flowchart of a method of controlling an electronic device according to an embodiment of the present invention.

FIG. 12 is a flowchart of a method of controlling an electronic device according to an embodiment of the present invention.

Referring to FIG. 12, in S1210, the electronic device is connected to a companion device. The electronic device may include a network processor and an application processor. In the electronic device, the application processor may request connection to a companion device from the network processor. Upon receiving a connection request from the companion device, the network processor may connect the application processor requesting connection to the companion device.

As described in the foregoing, the application processor may correspond to an application module or an application browser. Alternatively, the application processor may correspond to an HbbTV application. The network processor may be implemented as a network module. Alternatively, the network processor may correspond to a WebSocket server. When the network processor is implemented as the WebSocket server, each of the application processor and the companion device may be regarded as one client. Alternatively, each of a first client and a second client may be referred to as a peer.

The application processor may transmit information about an electronic device operating in the network processor or host request header information indicating companion device information to the network processor. In addition, in response to a connection request from the application processor, the network processor may generate a stream head of the application processor and include the stream head in a stream head group. Upon receiving a connection request from the companion device, the network processor may generate a stream head of the companion device and connect the generated stream head to a stream head of an application processor matched from a stream head group. In this instance, the network processor may remove the stream head of the matched application processor or the stream head of the companion device from the stream head group. Meanwhile, the application processor may transmit an IP address of a companion device to be connected, and respective applications may use the same port.

In S1220, the electronic device may exchange data with the companion device. Through this process, the electronic device may be connected to the companion device to perform communication.

The electronic device and the control method according to the specification are not restricted to configurations and methods of the above-described embodiments, and all or some of the respective embodiments may be selectively combined and variously changed.

Meanwhile, the method of controlling the electronic device of the present specification may be implemented as software in a processor-readable recording medium included in the electronic device. The processor-readable recording medium may include all types of recording devices storing data readable by a processor. Examples of the processor-readable recording medium may include a ROM, a RAM, a CD-ROM, a magnetic tape, a floppy disk, an optical data storage device, etc. In addition, the examples include a carrier-wave type implementation such as a transmission over the Internet. Furthermore, as the processor-readable recording medium is distributed to a computer system connected via a network, processor-readable code can be saved and executed in a distributed manner.

Further, even though preferred embodiments of the present invention have been illustrated and described, the present invention is not restricted to a certain embodiment described above, and various modifications and variations can be made by those skilled in the art without departing from the subject matter of the present invention as defined by the claims. Furthermore, these modified embodiments should not be understood separately from the spirit or scope of the present invention

INDUSTRIAL APPLICABILITY

The present invention is applicable to an electronic device.

The invention claimed is:
1. An electronic device comprising:
a processor;
a non-transitory recording medium;
an electronic device application to communicate with a companion device; and
a WebSocket server to connect the electronic device application with a companion device application of the companion device,
wherein the WebSocket server includes a first endpoint and a second endpoint,
wherein the first endpoint connects the WebSocket server with the electronic device application of the electronic device,
wherein the second endpoint connects the WebSocket server with the companion device application of the companion device,
wherein the WebSocket server receives a first request from the electronic device application of the electronic device,
wherein the first request includes first uniform resource information including first application identification information for identifying the electronic device application and a connection between the first endpoint and a first app-endpoint of the electronic device application is established,
wherein the first app-endpoint includes the first application identification information,
wherein the WebSocket server receives a second request from the companion device application of the companion device,
wherein the second request includes second uniform resource information including second application identification information for identifying the companion device application and a connection between the second endpoint and a second app-endpoint of the companion device application is established,
wherein the second app-endpoint includes the second application identification information,
wherein the WebSocket server establishes a WebSocket connection by connecting the electronic device application with the companion device application based on a WebSocket protocol when the first app-endpoint and the second app-endpoint are the same, and
wherein the first uniform resource information and the second uniform resource information are configured without including Internet Protocol (IP) address information.

2. The electronic device according to claim 1, wherein the WebSocket server relays data between the companion device application of the companion device and the electronic device application of the electronic device based on the WebSocket connection.

3. The electronic device according to claim 1, wherein the first endpoint is a local service endpoint of the electronic device and the second endpoint is a remote service end point of the electronic device.

4. A method of controlling an electronic device, comprising:
providing, by a Web Socket server of the electronic device, a first endpoint and a second endpoint,
wherein the first endpoint connects the Web Socket server with an electronic device application of the electronic device, and
wherein the second endpoint connects the Web Socket server with a companion device application of a companion device;
receiving, by the WebSocket server, a first request from the electronic device application of the electronic device,
wherein the first request includes first uniform resource information including first application identification information for identifying the electronic device application and a connection between the first endpoint and a first app-endpoint of the electronic device application is established, and
wherein the first app-endpoint includes the first application identification information;
receiving, by the Web Socket server, a second request from the companion device application of the companion device,
wherein the second request includes second uniform resource information including second application identification information for identifying the companion device application and a connection between the second endpoint and a second app-endpoint of the companion device application is established, and
wherein the second app-endpoint includes the second application identification information; and
establishing a Web Socket connection by connecting the electronic device application with the companion device application based on a WebSocket protocol when the first app-endpoint and the second app-endpoint are the same, wherein the first uniform resource information and the second uniform resource information are configured without including Internet Protocol (IP) address information.

5. The method according to claim 4, wherein the WebSocket server relays data between the companion device application of the companion device and the electronic device application of the electronic device based on the WebSocket connection.

6. The method according to claim 4, wherein the first endpoint is a local service endpoint of the electronic device and the second endpoint is a remote service end point of the electronic device.

\* \* \* \* \*